United States Patent
Furusawa et al.

(10) Patent No.: US 7,860,127 B2
(45) Date of Patent: Dec. 28, 2010

(54) SIGNAL PROCESSING APPARATUS AND METHOD, RECORDING MEDIUM AND PROGRAM

(75) Inventors: Akira Furusawa, Kanagawa (JP); Satoshi Kobayashi, Tokyo (JP); Kenichi Suzuki, Tokyo (JP)

(73) Assignee: Sony Corporation, Tokyo (JP)

(*) Notice: Subject to any disclaimer, the term of this patent is extended or adjusted under 35 U.S.C. 154(b) by 2201 days.

(21) Appl. No.: 10/165,930

(22) Filed: Jun. 10, 2002

(65) Prior Publication Data

US 2002/0196363 A1 Dec. 26, 2002

(30) Foreign Application Priority Data

Jun. 11, 2001 (JP) ............................. 2001-175457

(51) Int. Cl.
*H04J 3/24* (2006.01)

(52) U.S. Cl. .................. 370/474; 370/522; 375/240.26; 348/461

(58) Field of Classification Search ........................ None
See application file for complete search history.

(56) References Cited

U.S. PATENT DOCUMENTS

| | | | |
|---|---|---|---|
| 6,588,014 B1 * | 7/2003 | Hayashi ........................ 725/54 |
| 6,643,449 B1 * | 11/2003 | Nagata et al. .................. 386/46 |
| 6,952,521 B2 * | 10/2005 | Kelly et al. .................... 386/52 |
| 6,986,159 B1 * | 1/2006 | Shimoji et al. ............... 725/142 |
| 7,000,246 B1 * | 2/2006 | Takao .......................... 725/141 |
| 7,254,312 B2 * | 8/2007 | Yamada et al. ................. 386/94 |
| 2002/0154694 A1 * | 10/2002 | Birch .................... 375/240.05 |
| 2005/0238056 A1 * | 10/2005 | Takatori et al. ............. 370/486 |

* cited by examiner

*Primary Examiner*—Seema S Rao
*Assistant Examiner*—Rhonda Murphy
(74) *Attorney, Agent, or Firm*—Frommer Lawrence & Haug LLP; William S. Frommer; Thomas F. Presson

(57) ABSTRACT

A signal processing apparatus capable of minimizing the required processing so that a data packet containing a described discontinuity information table can be inserted preferably in a transport stream (partial stream). In this apparatus, a stream layer model storage has a model of the table to be stored in a DIT (Discontinuity Information Table) packet indicating a discontinuity point of a stream layer. A DIT packet insertion controller refers to the information set in an insertion timing setting register and, upon arrival of the timing to insert the DIT packet, the information preset in a description contents setting register is inserted into the model to thereby generate the DIT packet, and then the generated packet is inserted at the discontinuity point of the transport stream (partial stream).

6 Claims, 10 Drawing Sheets

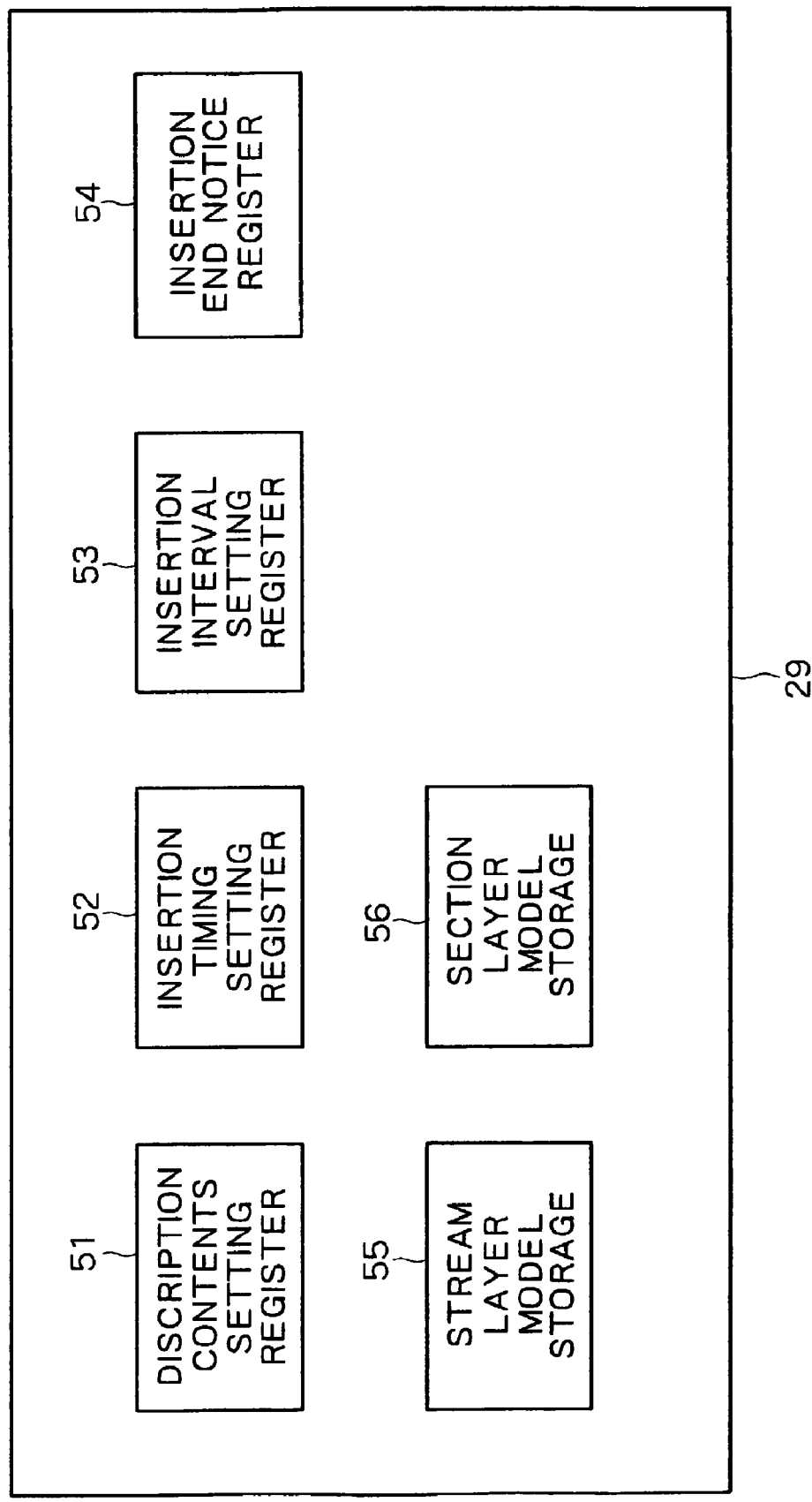

FIG.6

| DATA NAME | BIT LENGTH | VALUE | SUPPLEMENT |
|---|---|---|---|
| sync_byte | 8 | 47h | |
| transport_error_indicator | 1 | 0 | |
| payload_unit_status | 1 | 0 | |
| transport_priority | 1 | — | SETTABLE; INITIAL VALUE 1 |
| PID | 13 | — | SETTABLE; INITIAL VALUE 1EH |
| transport_scramble | 2 | 00 | |
| adaptation_field | 2 | 10 | |
| continuity_counter | 4 | — | SETTABLE; INITIAL VALUE 0    +1 PER INSERTION OF 1 PACKET |
| adaptation_field_length | 8 | B7h | |
| discontinuity_indicator | 1 | 1 | |
| random_access_indicator | 1 | 0 | |
| elementary_stream_p | 1 | 0 | |
| PCR_flag | 1 | 0 | |
| OPCR_flag | 1 | 0 | |
| splicing_point_flag | 1 | 0 | |
| transport_private_data | 1 | 0 | |
| adaptation_filed_exte | 1 | 0 | |
| stuffing_byte | 1456 | all "1" | |

FIG.7

| DATA NAME | BIT LENGTH | VALUE | SUPPLEMENT |
|---|---|---|---|
| sync_byte | 8 | 47h | |
| transport_error_indicator | 1 | 0 | |
| payload_unit_status | 1 | 0 | |
| transport_priority | 1 | — | SETTABLE; INITIAL VALUE 1 |
| PID | 13 | — | SETTABLE; INITIAL VALUE 1EH |
| transport_scramble | 2 | 00 | |
| adaptation_field | 2 | 10 | |
| continuity_counter | 4 | — | SETTABLE; INITIAL VALUE 0  +1 PER INSERTION OF 1 PACKET |
| pointer_field | 8 | 00h | |
| table_id | 8 | 7Eh | |
| Section_syntax_indicator | 1 | 0 | |
| reserved_future_use (1) | 1 | — | SETTABLE; INITIAL VALUE 1 |
| reserved_future_use (2) | 2 | — | SETTABLE; INITIAL VALUE 11 |
| section_length | 12 | 001h | |
| transition_flag | 1 | — | SETTABLE; INITIAL VALUE 1 |
| reserved_future_use (3) | 7 | — | SETTABLE; INITIAL VALUE 7FH |
| stuffing_byte | 1432 | all "1" | |

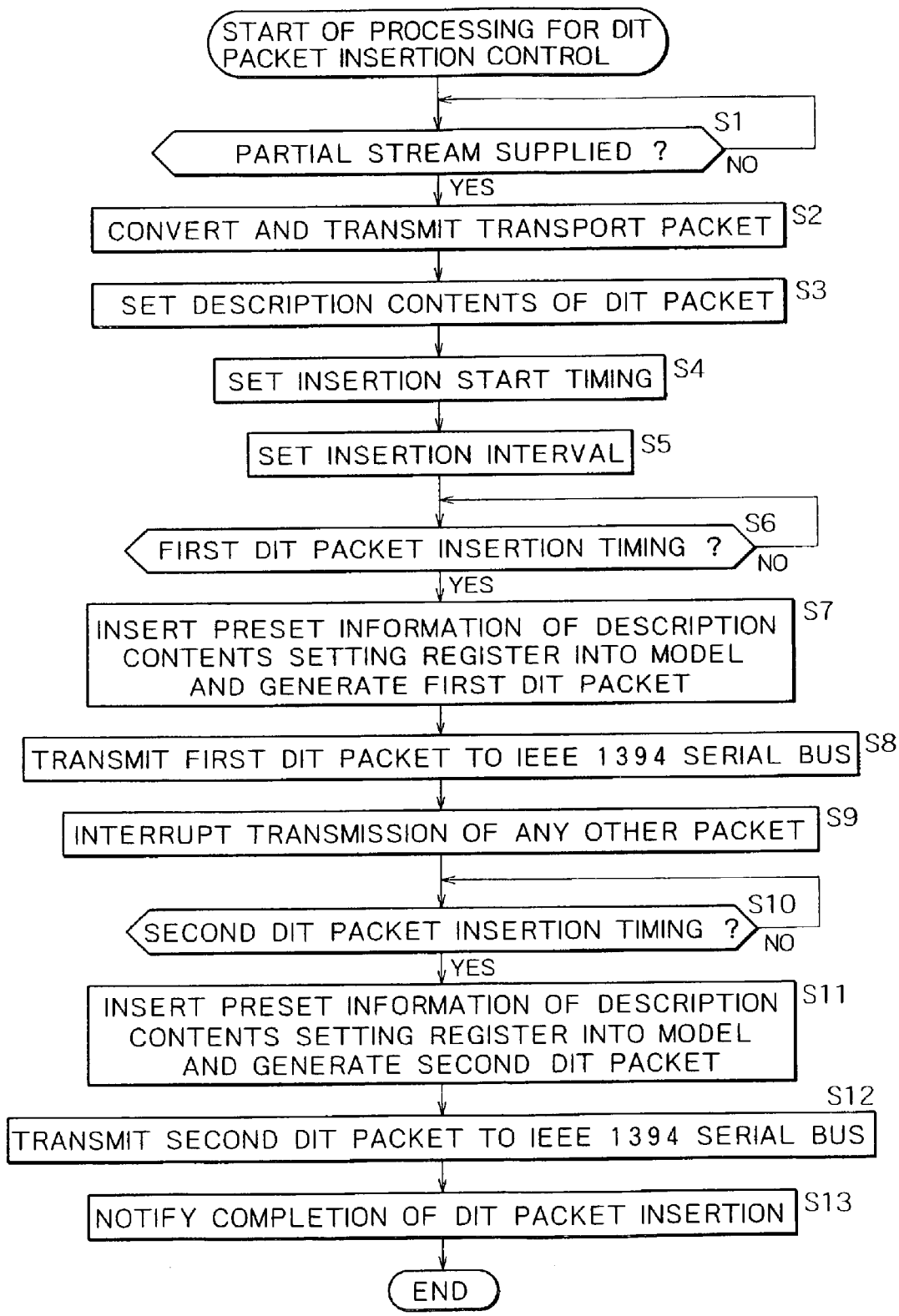

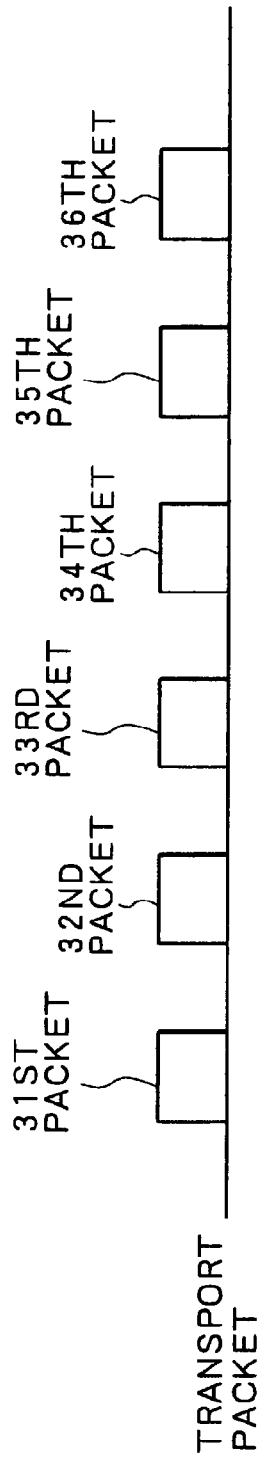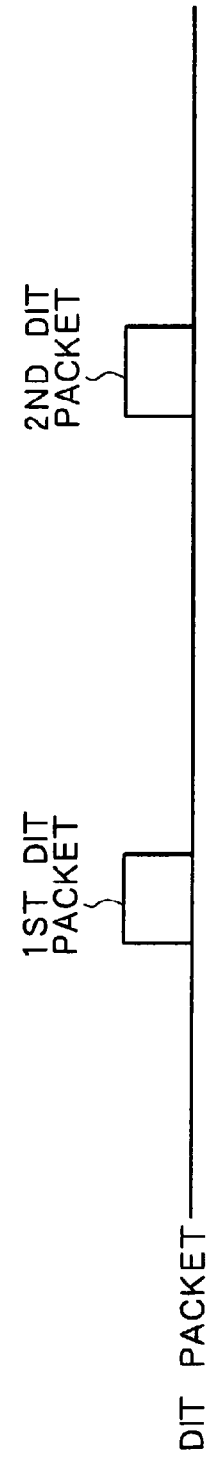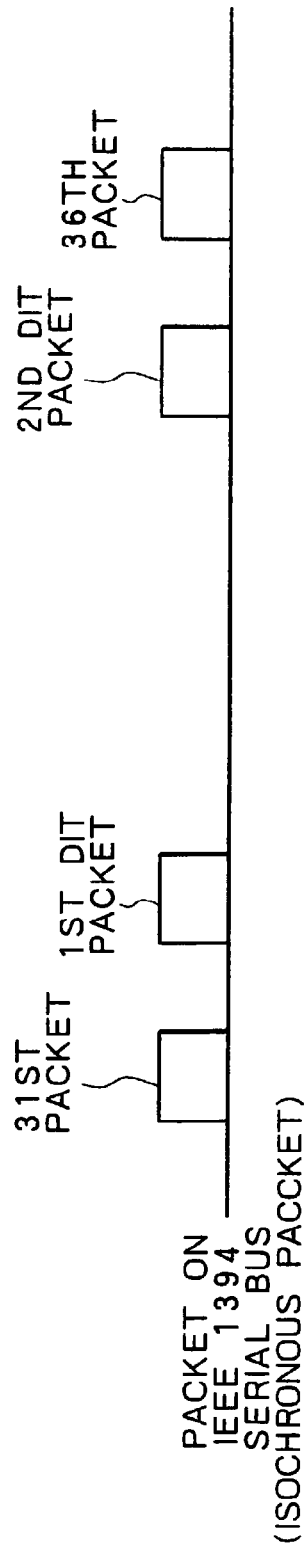

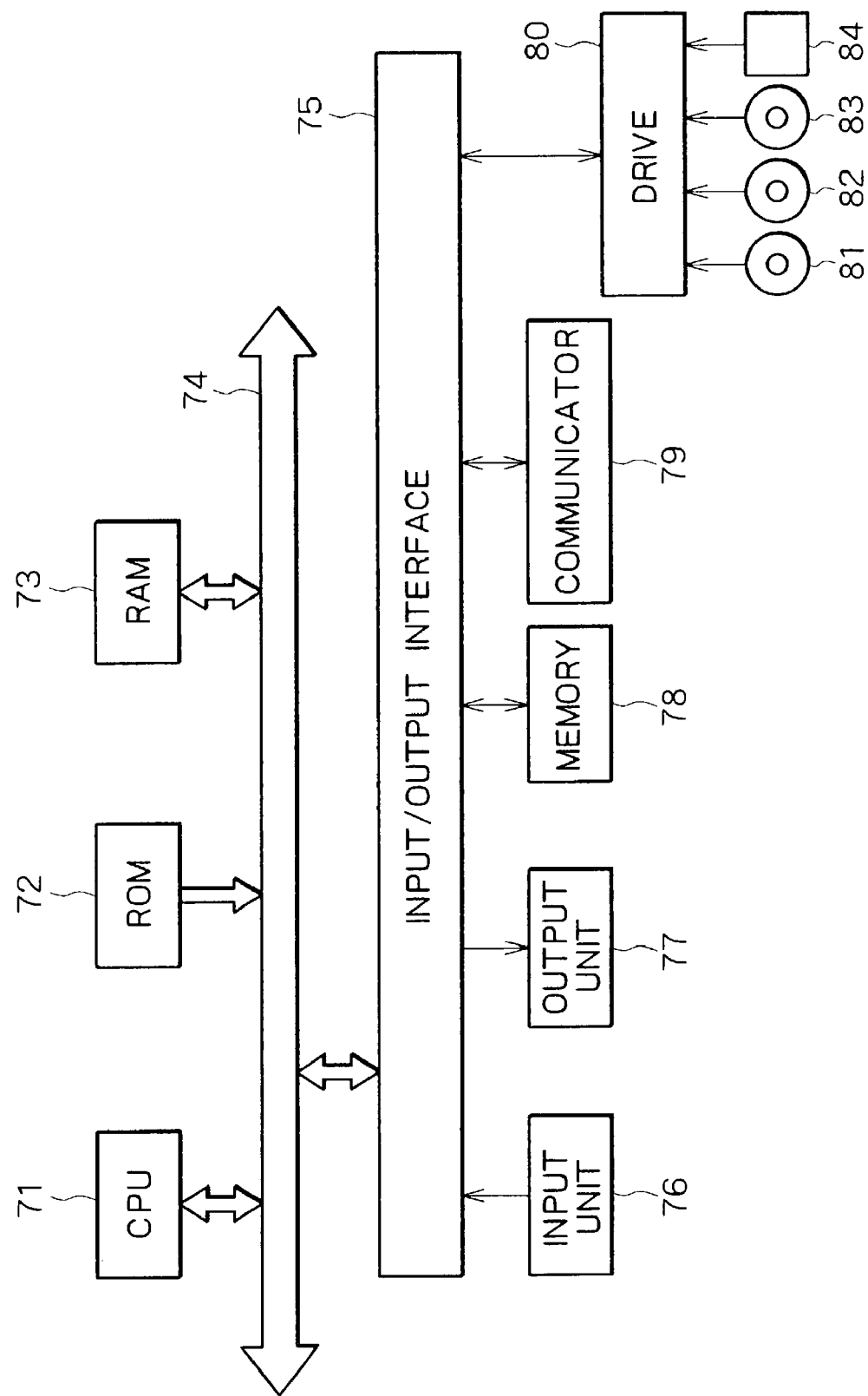

SIGNAL PROCESSING APPARATUS AND METHOD, RECORDING MEDIUM AND PROGRAM

BACKGROUND OF THE INVENTION

The present invention relates to a signal processing apparatus and method, a recording medium and a program, and more particularly to those adapted for minimizing the required processing to realize more adequate insertion of packets each indicative of discontinuity of a stream or the like.

There is currently observed wide diffusion of digital television broadcasting which compresses television program data composed of video and audio data on the basis of high-efficiency encoding technology conforming with the MPEG (Moving Picture Experts Group)-2 system or the like, and broadcasts the compressed program data via a satellite.

A viewer can select a desired program by manipulating an STB (Set Top Box) which is a terminal to receive and reproduce the digital television broadcast waves, and displaying an EPG (Electronic Program Guide) and so forth.

In the MPEG-2 mentioned above, there is provided a multiprogram function for transmitting a plurality of programs inclusive of program data, wherein the respective programs are time-division multiplexed in the form of transport packets which are relatively short units of transmission.

A plurality of transport packets constitute a transport stream, which is processed by the STB.

FIG. 1 is a diagram for explaining a transport stream to be processed by the STB.

The stream shown in the upper row is termed a full stream wherein the program to be reproduced has not yet been selected by the viewer. The full stream consists of packets (1st, 5th, 8th) representing the data of a channel (program) A, packets (2nd, 7th, 10th, 11th) representing the data of a channel B, and packets (3rd, 6th, 9th, 12th) representing the data of a channel C.

An SI (service information) packet (4th) is included in the full stream of FIG. 1. There is described, in this packet, service information to indicate which packet is to be extracted and decoded for reproducing the program.

The stream shown in the lower row in FIG. 1 is termed a partial stream extracted from the full stream in response to a command sent from the viewer for reproduction and so forth. The example of FIG. 1 denotes one case where the viewer has selected the channel A.

As shown in the partial stream of FIG. 1, the 1st, 5th and 8th packets representing the data of channel A are extracted, and the service information described in the 4th packet is rewritten, so that a new SI packet is included as a 23rd packet.

More specifically, out of the entire service information in the full stream, only the descriptor relative to channel A selected by the viewer is described in the SI packet (23rd), whereby the SI packet (4th) used in the broadcast is no longer included in the partial stream.

When the service information has been rewritten after extraction of the partial stream from the full stream, there occurs discontinuity of the stream and the service information (change in the switching or the description contents). Therefore, as shown in FIG. 1, packets (21st, 22nd) each having a stored discontinuity information table (DIT) indicative of a discontinuity point are inserted in the discontinuity points.

The discontinuity information table indicates a discontinuity point of a stream or the like as mentioned, and any fault that may be caused by reproduction of the stream discontinuity point is avoided on the basis of such information. For example, in case the stream to be reproduced is a video stream, the information is used for eliminating reproduction of the discontinuity point, or for blacking out the reproduced stream to thereby realize no display of the corresponding video image.

However, in any conventional STB known heretofore, there exists a problem that, when a packet containing a described discontinuity information table is inserted, the information needs to be entirely re-described each time, hence increasing the processing load to a great extent.

SUMMARY OF THE INVENTION

The present invention has been accomplished in view of the circumstances mentioned above, and it is an object of the invention to provide improvements adapted for minimizing the required processing to achieve more adequate insertion of packets each containing a described discontinuity information table.

According to a first aspect of the present invention, there is provided a signal processing apparatus which includes a first description contents setting means for setting information to be described in a first packet indicating a discontinuity point of a transport stream; a first generation means for generating the first packet by inserting, into a first model, the information set by the first description contents setting means and described in the first packet; and a transmission control means for controlling transmission of the first packet generated by the first generation means.

The signal processing apparatus further includes a second description contents setting means for setting information to be described in a second packet indicating a discontinuity point of service information which is rendered discontinuous concomitantly with the discontinuity of the transport stream; and a second generation means for generating the second packet by inserting, into a second model different from the first model, the information set by the second description contents setting means and described in the second packet. In this apparatus, the transmission control means may be capable of controlling, in addition to the transmission of the first packet, transmission of the second packet generated by the second generation means.

The transmission control means may be capable of controlling the transmission of the first and second packets to an IEEE 1394 serial bus.

Further, the transmission control means may be capable of transmitting the second packet after a lapse of a predetermined time period from the transmission of the first packet, and inhibiting transmission of any other packet supplied during such a time period.

According to a second aspect of the present invention, there is provided a signal processing method which includes a first description contents setting step of setting information to be described in a first packet indicating a discontinuity point of a transport stream; a first generation step of generating the first packet by inserting, into a first model, the information set at the first description contents setting step and described in the first packet; and a transmission control step of controlling transmission of the first packet generated at the first generation step.

According to a third aspect of the present invention, there is provided a recording medium containing a recorded program which includes a first description contents setting step of setting information to be described in a first packet indicating a discontinuity point of a transport stream; a first generation step of generating the first packet by inserting, into a first model, the information set at the first description contents setting step and described in the first packet; and a transmission control step of controlling transmission of the first packet generated at the first generation step.

According to a fourth aspect of the present invention, there is provided a program which causes a computer to execute a first description contents setting step of setting information to be described in a first packet indicating a discontinuity point of a transport stream; a first generation step of generating the first packet by inserting, into a first model, the information set at the first description contents setting step and described in the first packet; and a transmission control step of controlling transmission of the first packet generated at the first generation step.

In the signal processing apparatus and method, the recording medium and the program mentioned above, information indicating a discontinuity point of a transport stream and described in a first packet is set, and the information thus set to be described in the first packet is inserted into a first model, whereby the first packet is generated. Further, transmission of the generated first packet is controlled. Consequently, the information prescribed in the discontinuity information table need not be entirely re-described each time, hence minimizing the required processing.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a block diagram showing a detailed structural example of the DIT packet insertion controller in FIG. 3;

FIG. 6 is a diagram showing an exemplary model of a discontinuity information table described in a DIT packet;

FIG. 7 is a diagram showing another exemplary model of a discontinuity information table described in a DIT packet;

FIG. 8 is a flowchart for explaining a processing routine executed in the STB;

FIGS. 9A through 9C are diagrams for explaining DIT packets inserted by the STB; and FIG. 10 is a block diagram showing a structural example of a personal computer.

DETAILED DESCRIPTION OF THE PREFERRED EMBODIMENTS

Hereinafter some preferred embodiments of the present invention will be described in detail with reference to the accompanying drawings.

Figure 1:
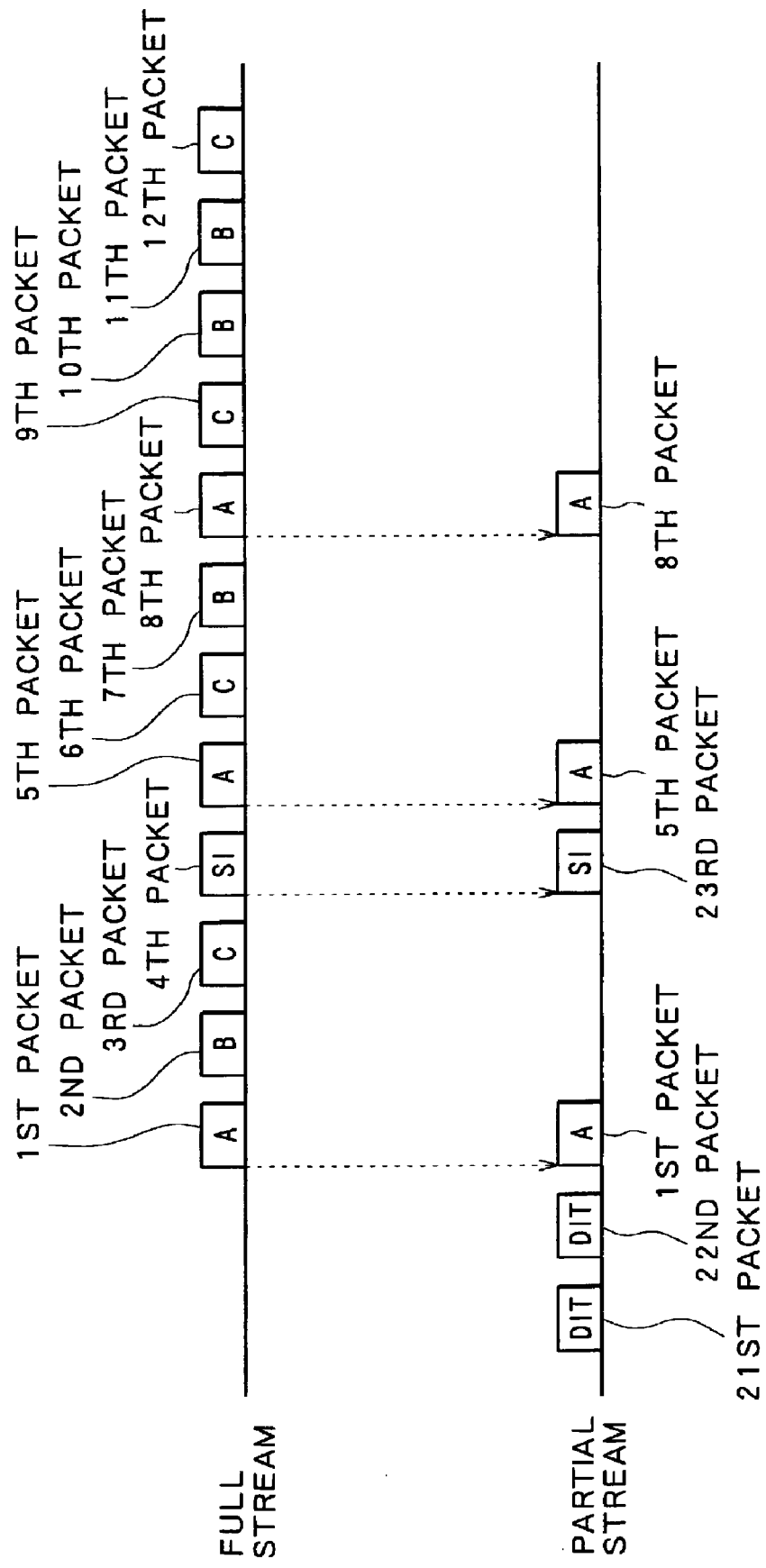
FIG. 1 is a diagram for explaining DIT packets inserted in a partial stream.
Figure 2:
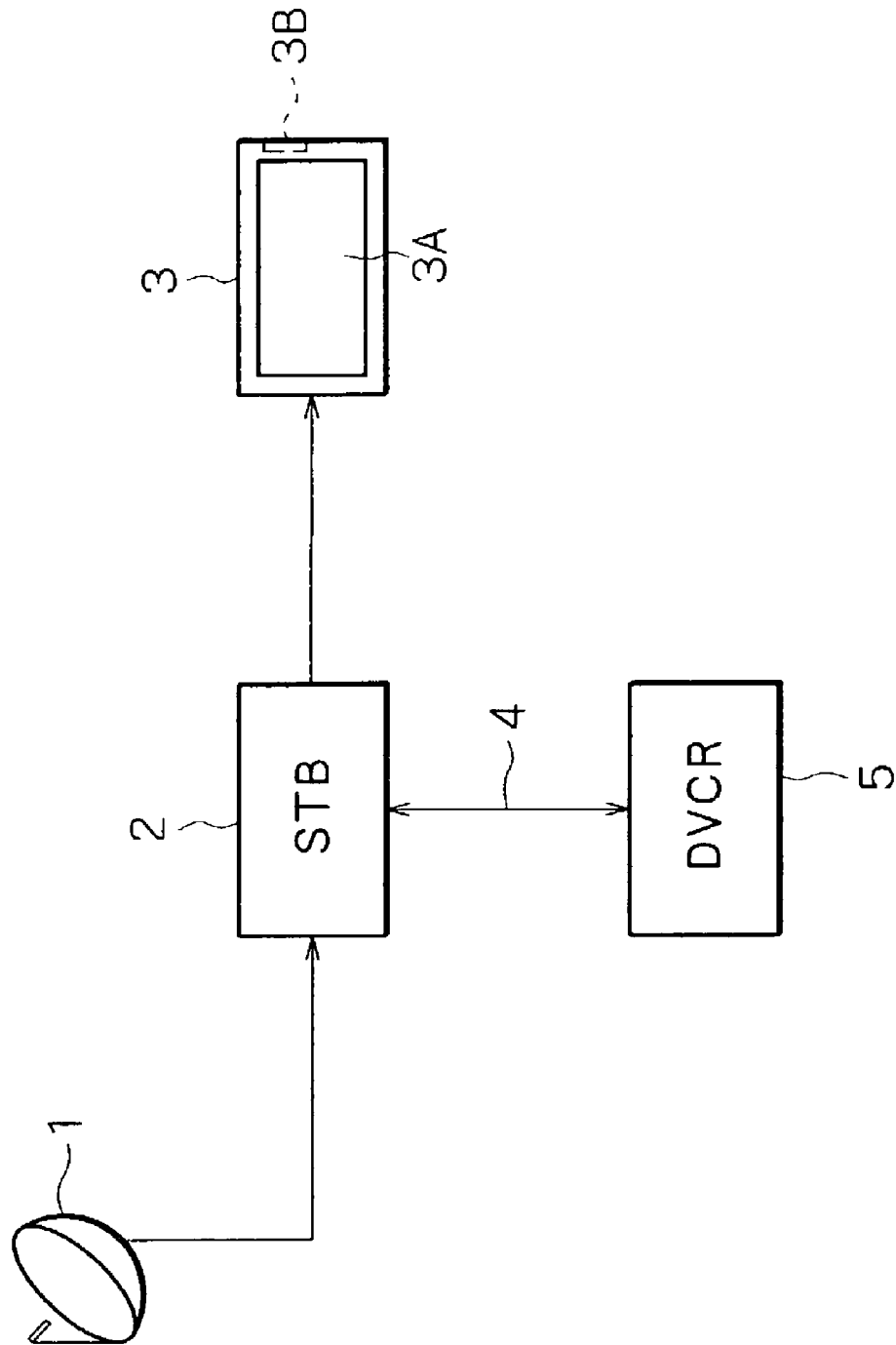
FIG. 2 is a block diagram showing an STB where the present invention is applied and some peripheral devices connected thereto.

FIG. 2 is a block diagram showing an STB 2 where the present invention is applied and exemplary peripheral devices connected thereto.

An input signal of digital broadcast waves received by an antenna 1 is supplied to the STB 2 where the input signal is descrambled and decoded, and then a video signal and an audio signal thus obtained are outputted respectively to a monitor 3A (FIG. 2) and a speaker 3B (FIG. 2) of a television receiver 3.

A DVCR (Digital Video Cassette Recorder) 5 is connected to the STB 2 via an IEEE (Institute of Electrical and Electronics Engineers) 1394 serial bus 4, and the output from the STB 2 is saved in a cassette loaded in the DVCR 5.

As will be described in detail later, the output from the STB 2 includes a packet (hereinafter referred to as DIT packet) storing therein a discontinuity information table (DIT) indicative of a discontinuity point (stream switching point) of a transport stream and also a discontinuity point of data having a section structure such as service information (SI) which is rendered discontinuous concomitantly with the discontinuity of the transport stream.

In reproducing the data saved by the DVCR 5, the STB 2 executes a processing routine of reproduction with reference to the discontinuity information table described in the DIT packet. More specifically, when the stream supplied via the IEEE 1394 serial bus 4 is a video stream, the STB 2 inhibits display of the video image at the discontinuity point on the monitor 3A with reference to the information described in the DIT packet, and blacks out the display only at the moment of reproduction of the discontinuity point, hence eliminating display of the video image on the monitor 3A.

Consequently, it becomes possible to repress disorder of the video image that may otherwise be caused by reproducing the discontinuity point of the stream.

In case the stream supplied via the IEEE 1394 serial bus 4 is an audio stream, the STB 2 inhibits output of the audio at the discontinuity point from the speaker 3B with reference to the information described in the DIT packet, hence repressing the disadvantage that the audio output is rendered indistinct due to reproduction of the discontinuity point.

As mentioned above, the discontinuity information table is referred to for repression of various disadvantages caused in reproduction of any stream including discontinuity points, such as a malfunction of the STB 2 induced by reproduction of any discontinuity point. Discontinuity of a stream is derived from changing the program (channel) to be displayed, while discontinuity of data having a section structure is derived from changing the description contents in accordance with change of the stream to be processed, and therefore such data discontinuity is concomitant with the stream discontinuity.

Figure 3:
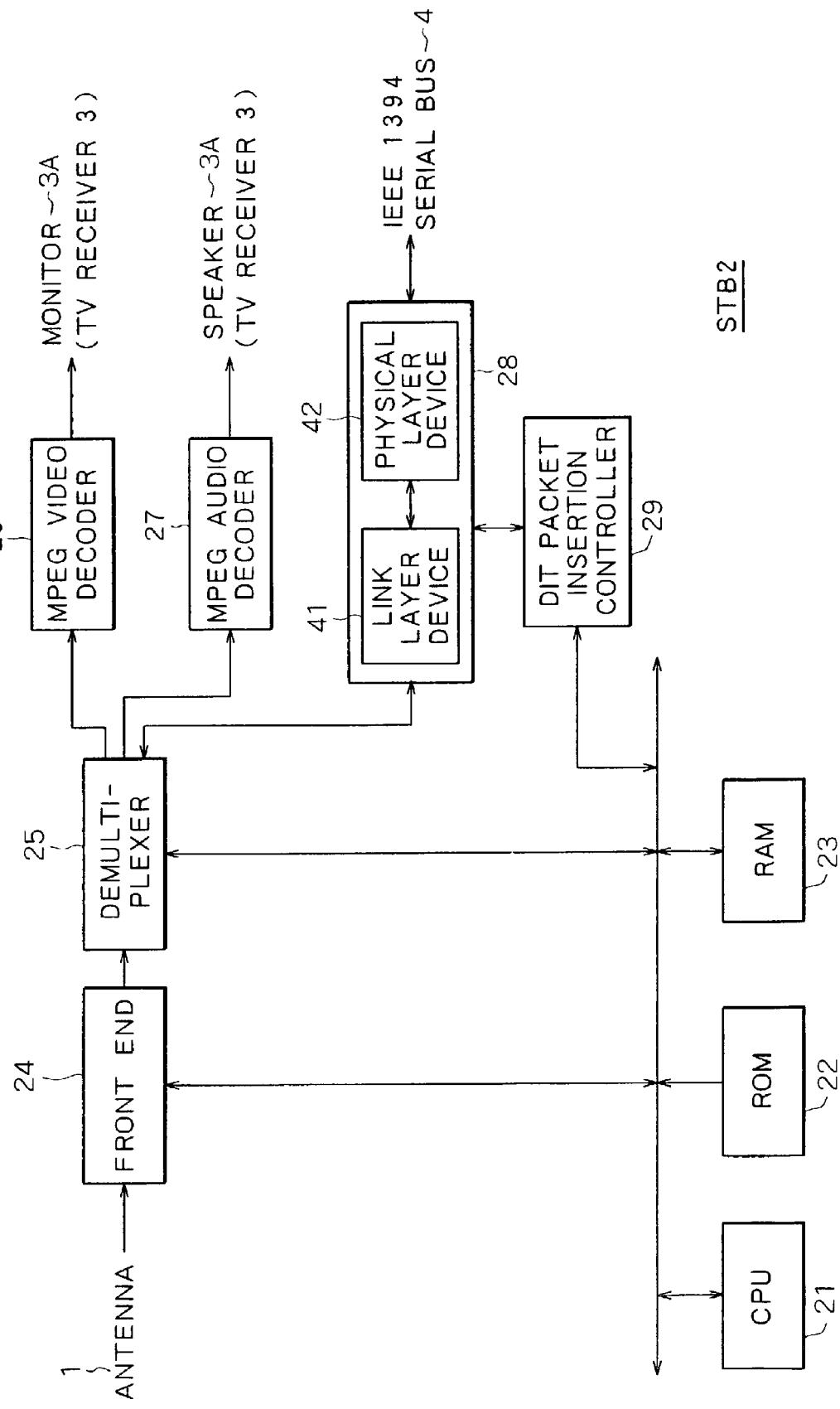
FIG. 3 is a block diagram showing a structural example of the STB.

FIG. 3 is a block diagram showing a structural example of the STB 2 in FIG. 2.

A CPU (Central Processing Unit) 21 expands a control program, which is stored in a ROM (Read Only Memory) 22, into a RAM (Random Access Memory) 23 and controls the entire operation of the STB 2 in response to an input command from a user (viewer).

The signal received and acquired by the antenna 1 is supplied to a front end 24, where the signal is demodulated and error-corrected under control of the CPU 21, and then the processed signal is supplied as a transport stream to a demultiplexer 25.

The demultiplexer 25 once stores, in an unshown buffer memory, packets which constitute the transport stream supplied thereto from the front end 24. Subsequently the demultiplexer 25 reads out the stored packets from the buffer memory at predetermined timings. In case the data (packets) are scrambled ones, the demultiplexer 25 decodes the read data by the use of encryption key data stored in an unshown IC card for example, and then outputs the extracted packets to a next-stage processor in accordance with an instruction from the CPU 21.

Hereinafter a "full stream" signifies a whole transport stream (an entire transport stream in the broadcast state) supplied from the front end 24 to the demultiplexer 25 prior to extraction of a desired transport stream. Further, a "partial stream" signifies a partial one (individual stream) obtained by extracting, in the demultiplexer 25, a desired transport stream from the full stream in accordance with an instruction from the CPU 21. That is, the full stream includes a plurality of partial streams.

The demultiplexer 25 outputs the extracted video data to an MPEG (Moving Picture Experts Group) video decoder 26 while outputting the extracted audio data to an MPEG audio decoder 27.

In case the instruction indicates supply of the extracted partial stream to the DVCR 5, the demultiplexer 25 outputs the extracted partial stream to an IEEE 1394 interface 28.

When the video data have been supplied from the demultiplexer 25, the MPEG video decoder 26 expands the received data in the MPEG-2 format for example, and then displays the video image data on the monitor 3A of the television receiver 3. Meanwhile, when the audio data have been supplied from the demultiplexer 25, the MPEG audio decoder 27 expands the received data in the MPEG-2 format for example, and then outputs the audio sound data to the speaker 3B of the television receiver 3.

The IEEE 1394 interface 28 processes, in conformity with the IEEE 1394 protocol, the transport packets which constitute the partial stream supplied from the demultiplexer 25 and, after converting the transport packets into isochronous or asynchronous packets, transmits the acquired packets to the IEEE 1394 serial bus 4.

The IEEE 1394 interface 28 includes a link layer device 41 relative to a link layer prescribed in the IEEE 1394 standard, and a physical layer device 42 relative to a physical layer prescribed in the IEEE 1394 standard.

Figure 4:
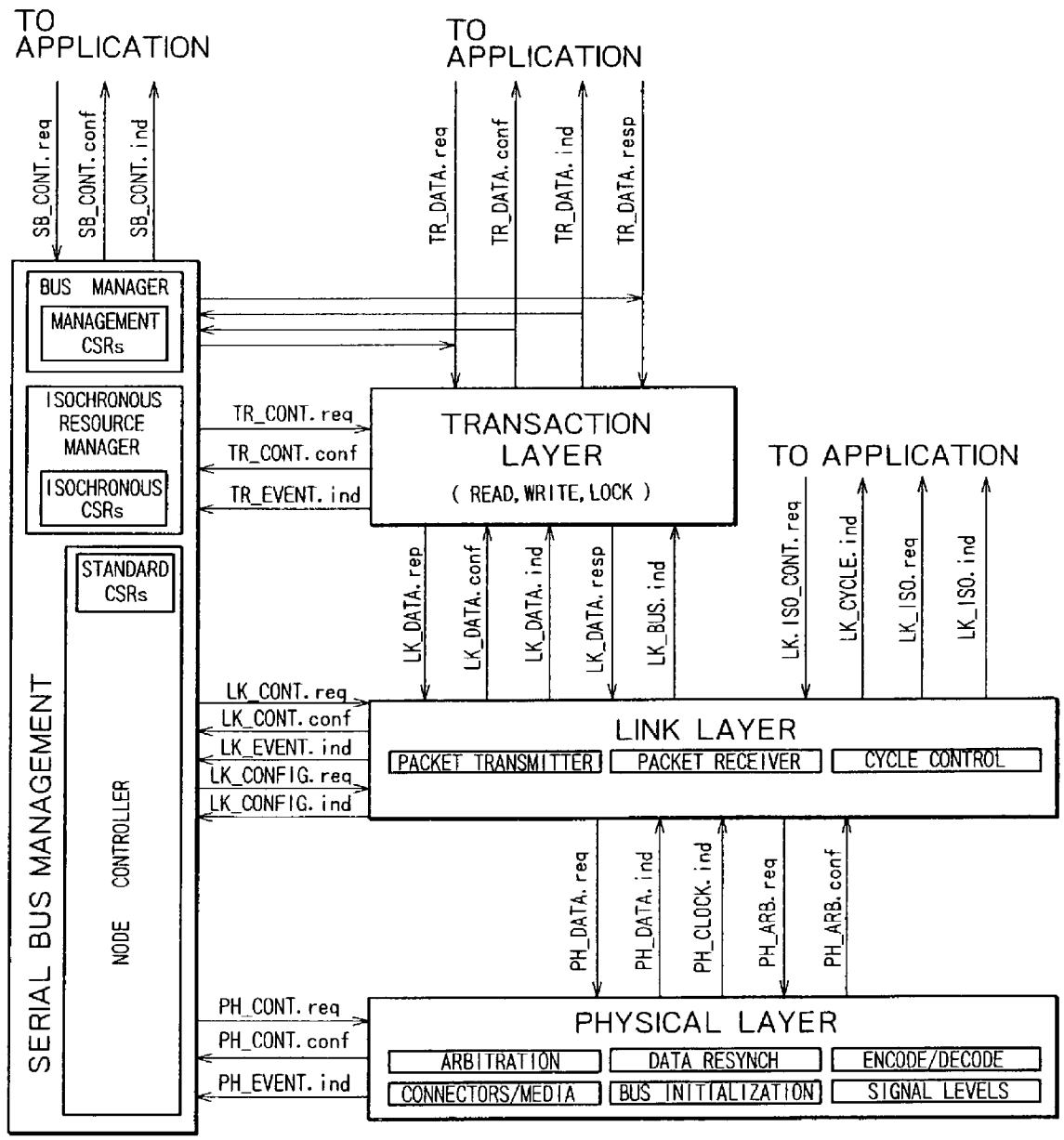
FIG. 4 is a diagram showing a layer structure of an IEEE 1394 serial bus.

Now the layer structure of the IEEE 1394 serial bus will be explained below with reference to FIG. 4.

The IEEE 1394 protocol has a three-layer architecture including a transaction layer, a link layer and a physical layer. These layers communicate with one another, and each of the layers also communicates with a serial bus management. Further, the transaction layer and the link layer communicate with an upper application as well. Transmission-reception messages used for such communication are classified into four kinds of request, indication, response and confirmation. Arrows in FIG. 4 denote such communication.

A communication having ".req" at the end of an arrowed message signifies request. Similarly, ".ind" stands for indication, ".resp" for response, and ".conf" for confirmation, respectively. For example, TR_CONT.req denotes a request message sent from the serial bus management to the transaction layer.

Upon reception of a request message from the application, the transaction layer provides an asynchronous transmission service for data communication with some other IEEE 1394 apparatus (having an IEEE 1394 interface), thereby realizing a request response protocol required in ISO/IEC 13213.

More specifically, the data transfer system conforming with the IEEE 1394 standard is classified into isochronous transmission and asynchronous transmission. The transaction layer executes a process of asynchronous transmission. In the asynchronous transmission, data are transmitted between IEEE 1394 devices by three kinds of transactions such as read transaction, write transaction and lock transaction each of which is a processing unit requested from the transaction layer protocol.

The link layer executes data transmission service using an acknowledge, addressing, data error check, data framing and so forth. Transmission of one packet executed by the link layer is termed a subaction which is classified into asynchronous subaction and isochronous subaction.

An asynchronous subaction is executed by designating a physical ID (identification) to specify a node (accessible unit in IEEE 1394) and an address in the node. The node having received the data returns an acknowledge. However, in an asynchronous broadcast subaction where data are sent to the entire nodes in the IEEE 1394 serial bus, any node having received the data does not return an acknowledge.

Meanwhile, in an isochronous subaction, data are transmitted with designation of a channel number in a fixed cycle (125 µs as described). In the isochronous subaction, none of acknowledge is returned.

The physical layer converts a logic symbol, which is used in the link layer, into an electric signal. The physical layer further executes a process for a request of arbitration (when nodes using the IEEE 1394 serial bus are concurrent) from the link layer, or executes reconfiguration of the IEEE 1394 serial bus concomitant with resetting of the bus, automatic allocation of the physical ID, and so forth.

The serial bus management realizes the fundamental bus control function and provides CSR (Control & Status Register Architecture) of ISO/IEC 13212. The serial bus management has functions of a node controller, an isochronous resource manager, and a bus manager. The node controller controls the node state, the physical ID and so forth to thereby control the transaction layer, the link layer and the physical layer. The isochronous resource manager provides the utilization situation of the resource used for isochronous communication. To perform isochronous communication, at least one of the IEEE 1394 devices connected to the IEEE 1394 serial bus needs to have the function of the isochronous resource manager. Functionally, the bus manager is the maximum of all and intends to achieve optimal utilization of the IEEE 1394 serial bus. The existence of the isochronous resource manager and that of the bus manager are optional.

On the basis of such a layer structure, the IEEE 1394 interface 28 converts the transport packets, which are included in the partial stream supplied thereto, into isochronous packets or asynchronous packets, and then transmits the converted packets to the IEEE 1394 serial bus.

In response to an instruction from the DIT packet insertion controller 29, the IEEE 1394 interface 28 inserts the DIT packet into, e.g., an isochronous packet stream obtained by converting the transport packets, and then outputs the same to the IEEE 1394 serial bus 4.

Subsequently, in response to an instruction from the CPU 21, the DIT packet insertion controller 29 sets each of registers incorporated therein, and controls the information to be described in the DIT packet, the timing to insert the DIT packet, and so forth in accordance with the setting.

FIG. 5 is a block diagram showing a detailed structural example of the DIT packet insertion controller 29.

A description contents setting register 51 sets predetermined information settable out of the various information prescribed in the discontinuity information table of a DIT packet indicative of a discontinuity point of a PES (Packetized Elementary Stream) layer, and also in the discontinuity information table of a DIT packet indicative of a discontinuity point of a section layer generated concomitantly with occurrence of the discontinuity in the stream.

Hereinafter a DIT packet indicating a discontinuity point of a stream will be referred to as a first DIT packet, and a DIT packet indicating a discontinuity point of a section will be referred to as a second DIT packet, respectively.

More specifically, a model of the discontinuity information table relative to the stream layer is prepared in a stream layer model storage 55, so that the description contents setting register 51 sets predetermined information settable out of those in such a model. Similarly, a model of the discontinuity information table relative to the section layer is prepared in a section layer model storage 56, so that the description contents setting register 51 sets predetermined information settable out of those in such a model.

An insertion timing setting register 52 sets a timing to insert a first DIT packet. Then the DIT packet insertion controller 29 refers to the information set in the insertion timing setting register 52, and inserts the first DIT packet into the stream including, e.g., isochronous packets.

An insertion interval setting register 53 sets a time interval from insertion of the first DIT packet to insertion of the second DIT packet.

For example, the first DIT packet and the second DIT packet are inserted at the boundaries of discontinuity points in the stream respectively, and the insertion interval setting register 53 sets the insertion interval between such two DIT packets. Accordingly, the DIT packet insertion controller 29 inserts the first DIT packet and, after a lapse of the time period preset by the insertion interval setting register 53, inserts the second DIT packet in the IEEE 13494 serial bus 4.

Upon completion of inserting the two DIT packets, an insertion end notice register 54 sets predetermined information and notifies each component block of the apparatus that insertion of the DIT packets has been completed.

As mentioned, the stream layer model storage 55 stores a model of the discontinuity information table described in the first DIT packet.

FIG. 6 is a diagram showing an exemplary model of the discontinuity information table stored previously in the stream layer model storage 55.

Sync_byte shown in the 1st row of FIG. 6 denotes data for detecting the beginning of the transport packet in a reproduction mode; transport_error_indicator in the 2nd row denotes data signifying the presence or absence of any bit error in the packet; and payload_unit_status in the 3rd row denotes data signifying that a new PES packet starts from a payload (effective data) of the packet.

Transport_priority shown in the 4th row denotes data signifying the degree of importance of the packet; PID (Packet ID) in the 5th row is information for identifying the packet; and transport_scramble in the 6th row denotes data to signify whether the data described in the payload of the packet are scrambled ones or not.

Further, adaptation_field shown in the 7th row denotes data signifying the presence or absence of an adaptation field in this packet, and also signifying the presence or absence of a payload; and continuity_counter in the 8th row denotes data for detecting whether or not the packets with the same PID have been partly rejected halfway.

The data shown in the 9th and following rows are those described in the adaptation field of this DIT packet. The adaptation field is used for optional entry of additional information and stuffing bytes (invalid data bytes) relative to the partial stream, wherein dynamic information of the stream can be transmitted by setting various information.

Adaptation_field_length shown in the 9th row denotes data signifying the length of this adaptation field; discontinuity_indicator in the 10th row denotes data signifying that, in the next packet having the same PID, its system clock is reset to update the contents; and random_access_indicator in the 11th row denotes data signifying a random-access entry point which corresponds to the beginning of a video sequence header or an audio frame.

Elementary_stream_p shown in the 12th row denotes data signifying that the important data in this stream are described in the payload; PCR (Program Clock Reference)_flag in the 13th row denotes data signifying the presence or absence of the information relative to a reference time set to a desired value on the encoder side; and OPCR (Original PCR)_flag in the 14th row denotes data signifying the presence or absence of the original PCR information.

Further, splicing_point_flag shown in the 15th row denotes data signifying the presence or absence (the number of packets having the same PID) of the splicing point in the stream; transport_private_data in the 16th row denotes data signifying the presence or absence of transport private data; adaptation_field_exte in the 17th row denotes data signifying the presence or absence of extension of the adaptation field; and stuffing_byte in the 18th row denotes invalid data.

In the example of FIG. 6, the respective bit lengths and values of the above-mentioned data are shown. The values of transport_priority (4th row), PID (5th row) and continuity_counter (8th row) are settable by the description contents setting register 51 in FIG. 5.

That is, the DIT packet insertion controller 29 sets the respective values of transport_priority, PID and continuity_counter, and then inserts such values into the model of FIG. 6 to thereby generate the first DIT packet.

Referring back to FIG. 5 again, the section layer model storage 56 stores therein a model of the discontinuity information table described in the second DIT packet.

FIG. 7 is a diagram showing an exemplary model of the discontinuity information table stored previously in the section layer model storage 56.

The data shown in the 1st to 8th rows of FIG. 7 are the same as those explained already with reference to FIG. 6, and therefore a repeated explanation is omitted here.

Pointer_field shown in the 9th row denotes data signifying the presence or absence of a pointer field in this packet; table_id in the 10th row denotes information to identify the table; and Section_syntax_indicator in the 11th row denotes data signifying the section structure.

Further, reserve_future_use (1), reserve_future_use (2) and reserve_future_use (3) shown in the 12th, 13th and 16th rows respectively denote data areas reserved for the future necessity of describing the data.

Section_length shown in the 14th row denotes data signifying the length of the section; transition_flag denotes data signifying a transition (change) of the section state; and stuffing_byte in the 17th row denotes invalid data.

In the example of FIG. 7 also, the respective bit lengths and values of the above-mentioned data are shown. The values of transport_priority (4th row), PID (5th row), continuity_counter (8th row), reserve_future_use (1) (12th row), reserve_future_use (2) (13th row), transition_flag (15th row) and reserve future use (3) (16th row) are settable by the description contents setting register 51 in FIG. 5.

That is, the DIT packet insertion controller 29 sets the respective values of transport_priority, PID, continuity_counter, reserve_future_use (1), reserve_future_use (2), transition_flag and reserve_future_use (3), and then inserts such values into the model of FIG. 7 to thereby generate the second DIT packet.

Referring now to a flowchart of FIG. 8, an explanation will be given on a processing routine executed by the STB 2 to control the timings of inserting the DIT packets.

At step S1, the DIT packet insertion controller 29 makes a decision as to whether or not any partial stream has been supplied from the demultiplexer 25 to the IEEE 1394 interface 28, and stands by until the result of such a decision becomes affirmative.

The demultiplexer 25 executes demodulation, error correction and so forth in response to instructions from the CPU 21 (user), and then extracts the partial stream from the full stream supplied from the front end 24. In case the instruction signifies save of the partial stream into the DVCR 5, the demultiplexer 25 supplies the extracted partial stream to the IEEE 1394 interface 28.

In extracting the partial stream, the demultiplexer 25 rewrites the service information and so forth in accordance with the partial stream, and then supplies, to the IEEE 1394 interface 28, the partial stream which includes the packets composed of the rewritten service information. More specifically, the demultiplexer 25 describes, in the SIT (Selection Information Table), the descriptor required as service information relative to the partial stream, out of the entire descriptors of the service information relative to the full stream, and then outputs the SIT.

In case the result of the decision at step S1 signifies that any partial stream has been supplied from the demultiplexer 25 to the IEEE 1394 interface 28, the operation of the DIT packet insertion controller 29 proceeds to step S2.

At step S2, the IEEE 1394 interface 28 converts the transport packets of the partial stream into isochronous packets and so forth under control of the DIT packet insertion controller 29, and transmits the converted packets to the IEEE 1394 serial bus 4.

Thereafter at step S3, the DIT packet insertion controller 29 sets the description contents of the DIT packet.

That is, the DIT packet insertion controller 29 sets, in the description contents setting register 51, the respective values of the data shown in FIG. 6, i.e., transport_priority (4th row), PID (5th row) and continuity_counter (8th row) to be inserted into the model of the discontinuity information table indicating the discontinuity point of the stream.

Further, the DIT packet insertion controller 29 sets, in the description contents setting register 51, the respective values of the data shown in FIG. 7, i.e., transport_priority (4th row), PID (5th row), continuity_counter (8th row), reserve_future_use (1) (12th row), reserve_future_use (2) (13th row), transition_flag (15th row) and reserve_future_use (3) (16th row) to be inserted into the model of the discontinuity information table indicating the discontinuity point of the section.

At step S4, the DIT packet insertion controller 29 sets, in the insertion timing setting register 52, the timing to insert the first DIT packet. Subsequently at step S5, the DIT packet insertion controller 29 sets, in the insertion interval setting register 53, the interval (time period) from insertion of the first DIT packet to insertion of the second DIT packet.

Thereafter at step S6, the DIT packet insertion controller 29 refers to the information set at step S4, then makes a decision as to whether or not the first DIT packet insertion timing has arrived, and stands by until the result of such a decision becomes affirmative.

In case the result of the decision at step S6 signifies that the first DIT packet insertion timing has arrived, the operation of the DIT packet insertion controller 29 proceeds to step S7, where the data set in the description contents setting register 51 are inserted into the model of the discontinuity information table indicating the discontinuity point of the stream as shown in FIG. 6 for example, so that the first DIT packet is generated.

At step S8, the IEEE 1394 interface 28 transmits the first DIT packet generated at step S7 to the IEEE 1394 serial bus 4 under control of the DIT packet insertion controller 29. At step S9, even if any other transport packet has been supplied, the IEEE 1394 interface 28 interrupts (inhibits) transmission of such other packet.

That is, none of transport packets (isochronous packets) is inserted between the first DIT packet and the second DIT packet Consequently, in reproducing the saved stream, it is possible to achieve more exact detection of the discontinuity point of the steam and that of the section.

In succession to transmission of the first DIT packet, the DIT packet insertion controller 29 makes a decision at step S10 as to whether or not the second DIT packet insertion timing has arrived, and stands by until arrival of the insertion timing.

In case the result of the decision at step S10 signifies that the second DIT packet insertion timing has arrived, the operation of the DIT packet insertion controller 29 proceeds to step S11, where the data set in the description contents setting register 51 are inserted into the model of the discontinuity information table indicating the discontinuity point of the section as shown in FIG. 7 for example, so that the second DIT packet is generated.

At step S12, the DIT packet insertion controller 29 transmits the second DIT packet generated at step S11 to the IEEE 1394 serial bus 4.

FIGS. 9A to 9C are diagrams for explaining how the transmission timings and so forth of packets are controlled by the DIT packet insertion controller 29 and the IEEE 1394 interface 28.

FIG. 9A shows an exemplary partial stream supplied from the demultiplexer 25 to the IEEE 1394 interface 28, wherein this partial stream is composed of 31st to 36th transport packets.

FIG. 9B is a diagram showing how the transmission of DIT packets is controlled by the DIT packet insertion controller 29. The time period between transmission of the first DIT packet to the IEEE 1394 serial bus 4 and transmission of the second DIT packet corresponds to the interval set by the insertion interval setting register 53.

FIG. 9C is a diagram showing the transport packets of FIG. 9A and the DIT packets of FIG. 9B converted into isochronous packets and transmitted to the IEEE 1394 serial bus 4. In FIGS. 9A to 9C, both the transport packets and the isochronous packets are illustrated to have substantially the same width. Actually, however, each transport packet is divided into a predetermined width of a cycle of 125 μs and is transmitted as an isochronous packet to the IEEE 1394 serial bus 4.

In the example of FIG. 9C, the first DIT packet is transmitted to the IEEE 1394 serial bus 4 at the supply timing of the 32nd packet of the partial stream to the IEEE 1394 interface 28. Further, the second DIT packet is transmitted to the IEEE 1394 serial bus 4 at the supply timing of the 35th packet of the partial stream to the IEEE 1394 interface 28.

As shown in FIG. 9C, none of transport packets is inserted between the first and second DIT packets, so that in a reproduction mode, any discontinuity point can be detected more exactly.

Referring back to FIG. 8 again, after transmission of the second DIT packet, the DIT packet insertion controller 29 sets, at step S13, predetermined information in the insertion end notice register 54, and then notifies each component block of the apparatus that insertion of the DIT packet has been completed.

The isochronous packet transmitted to the IEEE 1394 serial bus 4 as shown in FIG. 9C is processed by the DVCR 5 and is saved in a cassette loaded therein.

In reproducing the data saved in the cassette, since the isochronous packet shown in FIG. 9C is supplied, the IEEE 1394 interface 28 receives the supplied isochronous packet shown in FIG. 9C, then converts the received packet into a transport packet, and supplies the same to the demultiplexer 25. Subsequently, when the stream including the DIT packet has been supplied, the demultiplexer 25 reproduces the transport packet with reference to the discontinuity information table described in the relevant DIT packet, thereby avoiding the disadvantage that may otherwise be caused due to reproduction of the discontinuity point.

As mentioned above, a model of the discontinuity information table is prepared in advance, and when a DIT packet is to be transmitted, partial information thereof is set to generate a DIT packet which is then transmitted, so that the processing burden imposed on the CPU 21 and so forth can be reduced in comparison with the conventional case where the information contained in the discontinuity information table needs to be entirely re-described each time.

Further, the timings to transmit the first and second DIT packets are settable or changeable with facility, hence realizing more exact detection of the discontinuity points in a reproduction mode. For example, the transmission timings may be set in accordance with the kind of the stream to be reproduced, whereby more preferred measures are achievable against the discontinuity of the stream.

The processing routine explained above can be executed by means of software as well as by hardware. In this case, the STB 2 is composed of a personal computer shown in FIG. 10 for example.

In FIG. 10, a CPU 71 executes various processes in accordance with a program stored in a ROM 72 or a program loaded from a memory 78 to a RAM 73. In the RAM 73, there are also stored some data required for the CPU 71 to execute the various processes.

The CPU 71, the ROM 72 and the RAM 73 are connected with one another via a bus 74. Further, an input/output interface 75 is connected also to the bus 74.

To the input/output interface 75, there are further connected an input unit 76 including a keyboard, a mouse and so forth; an output unit 77 including a display device which includes a CRT (Cathode Ray Tube), an LCD (Liquid Crystal Display) and so forth and a speaker; a memory 78 including a hard disk and so forth; and a communicator 79 including a modem, a terminal adaptor and so forth. The communicator 79 performs communications via a network.

When necessary, a drive 80 is also connected to the input/output interface 75. The drive 80 is loaded with a magnetic disk 81, an optical disk 82, a magneto-optical disk 83 or a semiconductor memory 84, wherein a computer program read out therefrom is installed in the memory 78 as required.

In executing the processing routine by means of software, the routine can be executed by a computer where the program constituting such software is incorporated in its exclusive hardware, or can be installed from a network or a recording medium into, e.g., a general-purpose personal computer which is capable of executing various functions in accordance with various programs installed therein.

This recording medium connotes a package one distributed for providing programs to users separately from the apparatus, and it includes, as shown in FIG. 10, the magnetic disk 81 (including floppy disk), the optical disk 82 (including CD-ROM (Compact Disk-Read Only Memory) and a DVD (Digital Versatile Disk)), the magneto-optical disk 83 (including MD (Mini-Disc, trade name)), or the semiconductor memory 84 where programs are recorded. The recording medium may further include a hard disk and so forth contained in a ROM 72 or a memory 78 where programs are recorded and provided for users in a state incorporated previously in the apparatus.

In this specification, the steps that describe the program stored in the recording medium are executed in time series in accordance with the mentioned sequence, or may be executed in parallel or individually without being restricted to the time series processing.

Although the present invention has been mentioned hereinabove with reference to some preferred embodiments thereof, it is to be understood that the invention is not limited to such embodiments alone, and a variety of other changes and modifications will be apparent to those skilled in the art without departing from the spirit of the invention.

What is claimed is:

1. A signal processing apparatus comprising:
    a first description contents setting means for setting information to be described in a first packet indicating a discontinuity point of a transport stream;
    a first generation means for generating the first packet by inserting, into a first model, the information set by said first description contents setting means and described in the first packet;
    a second description contents setting means for setting information to be described in a second packet indicating a discontinuity point of service information concomitantly with the discontinuity of the transport stream; and
    a second generation means for generating the second packet by inserting, into a second model different from said first model, the information set by said second description contents setting means and described in the second packet,
    wherein no transport or isochronous packets are inserted between the first packet and the second packet; and
    a transmission control means for controlling transmission of the first packet generated by said first generation means and transmission of the second packet generated by said second generation means based on a transmission timing,
    wherein the first packet and the second packet are inserted into the transport stream at two discontinuity points in the transport stream respectively.

2. The signal processing apparatus according to claim 1, wherein said transmission control means controls the transmission of the first and second packets to an IEEE 1394 serial bus.

3. The signal processing apparatus according to claim 1, wherein said transmission control means transmits the second packet after a lapse of a predetermined time period from the transmission of the first packet, and inhibits transmission of any other packet supplied during such a time period.

4. A signal processing method executable on a computer, said method comprising:
    a first description contents setting step of setting information to be described in a first packet indicating a discontinuity point of a transport stream;
    a first generation step of generating the first packet by inserting, into a first model, the information set at said first description contents setting step and described in the first packet;
    a second description contents setting step of setting information to be described in a second packet indicating a discontinuity point of service information concomitantly with the discontinuity of the transport stream; and a second generation step of generating the second packet by inserting, into a second model different from said first model, the information set by said second description contents setting step and described in the second packet, wherein no transport or isochronous packets are inserted between the first packet and the second packet; and a transmission control step of controlling transmission of the first packet generated at said first generation step and transmission of the second packet generated by said second generation step based on a transmission timing, wherein the first packet and the second packet are inserted into the transport stream at two discontinuity points in the transport stream respectively.

5. A recording medium where a program readable by a computer is recorded, said program comprising:
- a first description contents setting step of setting information to be described in a first packet indicating a discontinuity point of a transport stream;
- a first generation step of generating the first packet by inserting, into a first model, the information set at said first description contents setting step and described in the first packet;
- a second description contents setting step of setting information to be described in a second packet indicating a discontinuity point of service information concomitantly with the discontinuity of the transport stream; and
- a second generation step of generating the second packet by inserting, into a second model different from said first model, the information set by said second description contents setting step and described in the second packet, wherein no transport or isochronous packets are inserted between the first packet and the second packet; and
- a transmission control step of controlling transmission of the first packet generated at said first generation step and transmission of the second packet generated by said second generation step based on a transmission timing, wherein the first packet and the second packet are inserted into the transport stream at two discontinuity points in the transport stream respectively.

6. A program recorded on non-transitory computer readable medium, said program causing a computer to execute:
- a first description contents setting step of setting information to be described in a first packet indicating a discontinuity point of a transport stream;
- a first generation step of generating the first packet by inserting, into a first model, the information set at said first description contents setting step and described in the first packet;
- a second description contents setting step of setting information to be described in a second packet indicating a discontinuity point of service information concomitantly with the discontinuity of the transport stream; and
- a second generation step of generating the second packet by inserting, into a second model different from said first model, the information set by said second description contents setting step and described in the second packet, wherein no transport or isochronous packets are inserted between the first packet and the second packet; and
- a transmission control step of controlling transmission of the first packet generated at said first generation step and transmission of the second packet generated by said second generation step based on a transmission timing, wherein the first packet and the second packet are inserted into the transport stream at two discontinuity points in the transport stream respectively.

* * * * *